Patented May 11, 1926.

1,584,472

UNITED STATES PATENT OFFICE.

AUGUST REGAL, OF BRNO, CZECHOSLOVAKIA.

PROCESS FOR THE MANUFACTURE OF ARTIFICIAL RESINS.

No Drawing. Application filed June 17, 1925. Serial No. 37,845.

It is well known that phenol or its homologues and formaldehyde or its polymers are capable of reacting upon each other forming so-called condensation products of a resinous character. The reaction between the phenols and formaldehyde proceeds much better if bases, acids or dissociating salts be used as condensing agents and the quantity of the condensing agents applied as well as the time in which the reaction promoted by heating is finished have a great influence on the physical and chemical properties of the products of condensation.

One object of the present process is to apply as condensing agent a substance which will be formed during the reaction itself and owing to its composition is not only capable of acting as a catalytic condensing agent but has at the same time the effect of giving the final condensation product the coloration desired.

In applying these condensing agents, the actual condensation reaction is controlled in such a manner that the formation of the water of reaction proceeds very slowly and gradually and there is no difficulty in getting rid of all the water by distillation in vacuo. Furthermore, I have found that the initial product of condensation (resol) is not suddenly, but quite gradually converted into the final product of condensation (resit) by heating, thus allowing the water plenty of time slowly to evaporate, so that the final product is free from cracks and fissures.

In accordance with my invention I apply as condensing agent the indophenols, which, as mentioned above, are formed during the reaction. For instance, I subject phenol or cresol, to which I add a small quantity of a p-aminoaryl compound to a moderate alkaline oxidation, until the aniline compound has nearly completely disappeared.

In this manner within the phenol an indophenol is formed which acts as a catalyst or a condensing agent. I then add the right quantity of formaldehyde—say for 1000 parts by weight of phenol about 800 parts of 40% formaldehyde—and boil the mass under a reflux condenser for some time, until the reaction is finished and the mass commences to stratify. The water is then distilled off, preferably in a vacuum and the remaining oily and viscous initial mass can then be hardened in the manner well known to experts by heating to a higher temperature.

I preferably use as an oxidizing agent for the aniline compound a small amount of permanganate, but I can apply with equal success other oxygen carriers.

In carrying out the process a phenolic body is mixed with a small quantity of a p-aminoaryl compound and the mass is heated preferably on a water bath for some time using a reflux condenser to avoid loss by volatilization. I then add a small quantity of an oxidizing agent and continue the boiling of the mass, until the aryl compound is destroyed. The necessary quantity of formaldehyde is then added and the boiling is continued, until the liquid mixture begins to separate into two layers, the top layer being water and some water-soluble substances, whereas the bottom oily and viscous layer is the well known initial condensation product.

Before hardening the initial condensation product, I can incorporate into it a great variety of inert solid materials, which may be added at any suitable stage of the process.

Example I.

To 1000 parts by weight of phenol are added 1 part of p-amidodimethylaniline and the mixture is heated on the water bath for about 1 hour. A small quantity, say about 0.05 part of permanganate is added which destroys the remainder of the p-amidodimethylaniline. 800 parts of 40% formaldehyde are then added and the mass is heated with a reflux condenser until the formation of the initial condensation product is finished and the liquid mass commences to separate into different layers, the top layer chiefly consisting of water, whereas the bottom layer is a viscous oily resinous liquid. The water is decanted or better still is removed by a distillation in vacuo. The product thus formed is of a bluish or green color according to the quantity of the indophenolic condensing agent used.

The dyestuff formed within the mass can be destroyed by the addition of dilute mineral acids which are best added before the distillation of the water.

Example II.

To 1000 parts by weight of phenol are added 1 part of p-amidophenol and the mixture is heated on the water bath for about one hour. The mass is then oxidized by the addition of an alkaline oxidizing agent and after adding 800 parts of 40% formaldehyde the reaction is proceeded as described under Example I.

What I claim and desire to secure by Letters Patent of the United States is:

A process for the manufacture of artificial resins consisting in reacting on phenols with formaldehyde at an elevated temperature in the presence of an indophenolic compound, formed by adding a small quantity of a p-aminoaryl compound and followed by a moderate oxidation, the said indophenolic compound acting as a condensing agent and at the same time giving a color to the condensation product.

In testimony whereof I affix my signature.

AUGUST REGAL.